US009652316B2

(12) United States Patent
Gamage et al.

(10) Patent No.: US 9,652,316 B2
(45) Date of Patent: May 16, 2017

(54) PREVENTING AND SERVICING SYSTEM ERRORS WITH EVENT PATTERN CORRELATION

(71) Applicants: Nimal K K Gamage, Fort Collins, CO (US); Richard Bennett Whitner, Fort Collins, CO (US)

(72) Inventors: Nimal K K Gamage, Fort Collins, CO (US); Richard Bennett Whitner, Fort Collins, CO (US)

(73) Assignee: CA, Inc., New York, NY (US)

( * ) Notice: Subject to any disclaimer, the term of this patent is extended or adjusted under 35 U.S.C. 154(b) by 93 days.

(21) Appl. No.: 14/674,780

(22) Filed: Mar. 31, 2015

(65) Prior Publication Data
US 2016/0292028 A1 Oct. 6, 2016

(51) Int. Cl.
G06F 11/00 (2006.01)
G06F 11/07 (2006.01)
G06F 11/34 (2006.01)
H04L 12/24 (2006.01)
G06F 9/54 (2006.01)

(52) U.S. Cl.
CPC ............ *G06F 11/079* (2013.01); *G06F 9/542* (2013.01); *G06F 11/076* (2013.01); *G06F 11/0709* (2013.01); *G06F 11/0748* (2013.01); *G06F 11/0772* (2013.01); *G06F 11/0793* (2013.01); *G06F 11/34* (2013.01); *H04L 41/00* (2013.01); *G06F 11/0754* (2013.01)

(58) Field of Classification Search
USPC ........................................................ 714/47.3
See application file for complete search history.

(56) References Cited

U.S. PATENT DOCUMENTS

| 6,249,755 B1* | 6/2001 | Yemini | G06F 11/2257 702/181 |
| 8,850,263 B1* | 9/2014 | Yourtee | G06F 11/0709 714/20 |
| 2003/0014692 A1* | 1/2003 | James | G05B 17/02 714/25 |
| 2012/0166869 A1* | 6/2012 | Young | G06F 11/008 714/15 |
| 2013/0311977 A1* | 11/2013 | Nieminen | G06F 11/3672 717/135 |

\* cited by examiner

*Primary Examiner* — Amine Riad
(74) *Attorney, Agent, or Firm* — Baker Botts L.L.P.

(57) ABSTRACT

A method includes receiving historical monitoring data for components of a system, the historical monitoring data comprising a plurality of events, each triggered by an associated component, and a plurality of alarms, each triggered by detection of a particular type of condition in the components. The method also includes determining common event sequences in the plurality of events, each event sequence culminating in one of the plurality of alarms. The method further includes correlating the common event sequences into an event pattern. The method also includes receiving a plurality of real-time events triggered by the components. The method additionally includes detecting the event pattern in the plurality of real-time events to predict a potential future instance of the particular type of condition in the components of the system.

20 Claims, 4 Drawing Sheets

PREVENTING AND SERVICING SYSTEM ERRORS WITH EVENT PATTERN CORRELATION

BACKGROUND

The disclosure relates generally to prevention and service of system errors, and more specifically to preventing and servicing system errors with event pattern correlation.

SUMMARY

According to one embodiment of the disclosure, a method includes receiving historical monitoring data for components of a system, the historical monitoring data comprising a plurality of events, each triggered by an associated component, and a plurality of alarms, each triggered by detection of a particular type of condition in the components. The method further includes determining common event sequences in the plurality of events, each event sequence culminating in one of the plurality of alarms. The method additionally includes correlating the common event sequences into an event pattern. The method also includes receiving a plurality of real-time events triggered by the components. The method still further includes detecting the event pattern in the plurality of real-time events to predict a potential future instance of the particular type of condition in the components of the system.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

Figure 1:
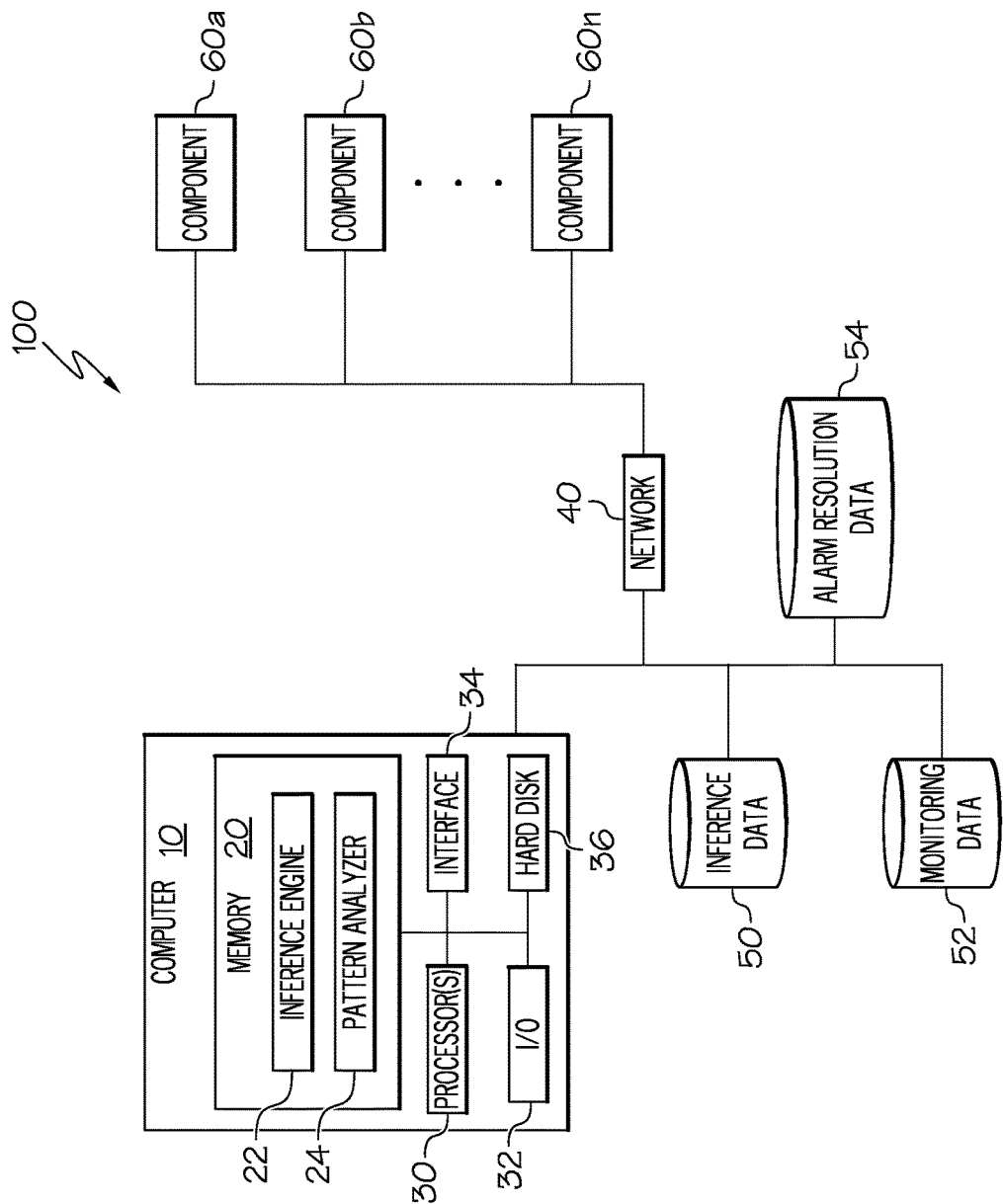
FIG. 1 illustrates a block diagram of a system for preventing and servicing system errors with event pattern correlation in accordance with a non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Infrastructure management tools provide visibility and insight into systems and infrastructure performance for large organizations, creating a single, unified architecture for both traditional and cloud computing environments and enabling proactive monitoring of performance and availability for ensuring that service to customers is effective and reliable. Infrastructure management tools balance IT point solution simplicity with enterprise solution scalability and multi-tenancy and may even reduce the need for disparate monitoring solutions. Thus, these systems may be used for proactive management of services and optimization of operational efficiency while reducing complexity, cost, and hassle of monitoring tool integration.

One element of this holistic, focused monitoring of applications and cloud-based infrastructures includes systems for monitoring system events and tracking system behaviors. Certain embodiments of the present disclosure may utilize system monitoring information to manage complex IT infrastructures including physical, virtual, and cloud environments by monitoring and storing mundane system events, including faults, errors, and alarms, so that when those faults manifest in a system, they can be triaged, isolated, studied and mitigated. Thus, these systems may enable automation of fault management and mitigation across a large IT infrastructure.

Fault management and mitigation strategies traditionally rely on the expertise of those system administrators who have learned to detect failure patterns in system events and prevent system errors and faults based on this experience by programming complex rules into event monitoring systems. However, such expertise is often gained empirically by trial and error and is often hard to pass on to others. Further, current fault monitoring systems may not be dynamic. That is, fault monitoring systems may not recognize patterns in event data and generate new rules based on analysis of historic monitoring data. Furthermore as network topology evolves such empirically determined patterns may not have the desired efficacy.

The teachings of the present include a dynamic inference-based fault correlation method for recognizing sequences of unrelated and/or random system events that are associated with a particular fault, correlating those events into repeatable recognizable patterns, and scanning real-time events for those detected patterns in anticipation of fault conditions occurring on some constituent system in a managed network of components. In certain embodiments, pattern detection algorithms may scan large numbers of seemingly unrelated system events and correlate the data based on historical events, relationships between event components, timing, underlying physical component associations, and the like.

Certain embodiments may additionally detect faults and errors in system components. Fault conditions can be specified for a single component or groups of components and applied globally, locally, or to a particular component in a managed network. These conditions may be user defined or automatically defined based on known component tolerances or thresholds. For example, utilization thresholds may be set for a particular component on a managed network. The particular component may be monitored in accordance with one of the above described management and monitoring systems. The system receives events corresponding to the utilization rates of the managed component. These events may be stored in a system management database. These events may be received in real-time, thus allowing the system to monitor real-time status of managed components. Monitoring of components using events and thresholds may be implemented for a large-scale IT infrastructure, thus allowing the system to monitor the status of each component in the infrastructure. These real-time events may also be archived in a database for examination of historical events and errors.

Events may indicate manifestation of fault conditions in particular system components. For example, if events received by the performance management system indicate that utilization rates for the particular component exceed the utilization rate thresholds, the system triggers an alert. The alert may notify an administrator or may trigger some other action in the system. Alerts may be positive or negative. For example, alerts may be triggered for exceeding an efficiency threshold. Alerts may signal that server consolidation may be possible. Alerts may also signify problems or errors in an IT infrastructure. Alerts are indicative of satisfaction of a set of defined criteria, as expressed through events received at a central management system, in a constituent system component.

The various descriptions and embodiments discussed in the present disclosure reference events, alarms, and alerts in connection with monitoring data managed by infrastructure management applications. For purposes of clarification, a description of each of these terms with respect to one particular embodiment is provided.

The term "event" may refer to a record of an incident that occurs at a given point in time while the term alarm may refer to a representation of an incident over a period of time. For example, an event can indicate that a network device is not reachable, while an alarm can track the state of the unreachable device incident from the time an alarm condition first manifests until such time as the alarm condition is resolved, addressed, or is otherwise closed.

The term "component" may refer to any entity capable of being monitored, for example, by an infrastructure management system. Component, as used herein, may refer to physical and/or virtual devices or entities such as physical or virtual input/output devices, interfaces, processors, memory, busses, resources, networks, routers, switches, hubs, ports, nodes or any other physical or physically indistinguishable device, object, or entity, whether implemented in software, hardware, or some other medium.

System events may be generated for a wide variety of seemingly mundane system tasks executed on various levels of component, application, or system architecture. For example, events may include system level events, application level events, operating system level events, hardware associated events. Events may be defined or abstracted through many layers of granularity. Some, many, or all events may be maintained by the system monitoring process. Historical event data may be used in testing, training, or programming new inferences.

System events may be screened or analyzed in real-time to detect system errors, failures, and fault conditions as described above. However, system events may also be screened or analyzed in real time to detect, predict, or infer a more serious system event, fault condition, error or failure. For example, known event patterns may be stored in an infrastructure management and monitoring solution. Incoming real-time events may be analyzed for sequences of events that match the known event patterns in the infrastructure management database. If the system detects a matching pattern in the incoming real-time events, the system may infer that an error condition or other fault condition may be about to manifest in a particular system component. For example, using the database of known event patterns, the system may infer future errors within the system.

The system may issue inference handlers to handle or mitigate the future error or fault condition before, during, or after it occurs. For example, defined patterns of behavior may be established for reaction to the detection of event patterns in incoming real-time system events. The patterns of behavior may be tested empirically and programmed by an administrator after years of troubleshooting a particular fault manifestation. Thus, a system may automatically react to and deploy preventative maintenance operations, configuration setting modifications, or infrastructure modifications upon detection of the system event patterns in order to respond to or even prevent future system errors.

Such a system may improve reaction time for critical system errors. For example, a system that automatically deploys a troubleshooting solution to fix a detected fault condition inference may significantly reduce or eliminate downtime as compared to a system that merely alerts an administrator upon generating an alert after manifestation of said fault condition. Further, a system that automatically deploys inference handlers or solutions to fix or prevent future fault conditions or errors may significantly reduce or eliminate system downtime as compared to a system that merely alerts an administrator that a fault correlation pattern has been detected in real-time events because the system's automatic reaction may be much faster and accurate than the administrator's manual reaction.

Further, systems may be programmed with specific event patterns, but may lack any intelligence regarding analysis, correlation, and generation of inferences based on historical event data. For example, while real-time events may be monitored and defined patterns may be compared against the monitored events to detect pattern matches in the real-time event data, infrastructure management systems may lack intelligence into generation of patterns. These patterns may be generated manually by an administrator, distributed with the infrastructure management application, and/or updated periodically. These stock, pre-defined event patterns may have been assembled through study of test system events and administrator know-how. However, historical data for managed network components may be a better source for generation of event patterns and inference handlers. For example, system events for a particular system may be more indicative of future system behavior for that system than generic system events from a test system. Configurations, relationships, and physical components may vary greatly between generic test systems and each customer component network. Accordingly, these relationships and configurations may be used to generate event patterns that are customized to managed networks on which infrastructure management systems are deployed.

In certain embodiments, validation of event patterns or processes is a continuous process. Thus evolution of event patterns and processes may continue to develop beyond the maturity of legacy, predefined event patterns that are manually implemented or arrived at by mere human knowledge. For example, a system with the capability to customize, learn, modify existing event patterns and create new event patterns may be more robust than a system with a set of stagnant, predefined event patterns.

In certain embodiments, event patterns, or repeatable or prevalent event clusters, may be coincident or distributed with respect to time. At least two general solutions may exist for handling event patterns in each of these cases. One example solution includes the determination of probable or predicted cause solutions. Such a solution may be implemented upon discovery of event clusters that are distributed in time. Another example solution includes the determination of root cause solutions. This solution may be implemented upon discovery of event clusters that are coincident in time.

The probable cause solution includes predicting future conditions in a system based on detection of a series of persistent event patterns in the system. For example, an event pattern may be detected in several scenarios. In each of the scenarios some system condition may occur later in time. In one example, the system condition is the same system condition in each of the scenarios. When this occurs, the system may generate an inference that detection of these persistent event patterns leads to the occurrence of this system condition.

The system may then dig deeper into the cause of the system condition. For example, the system may determine a host machine associated with each of the sources of the events in the event pattern. The system may examine various entities associated with each of the event patterns to determine a probable cause of the future system condition. In this way, the system may determine a probable cause of the system condition based on the persistent event pattern. For example, the system may determine that the events in the event pattern were each generated from a respective system entity that is hosted by a particular machine that has failed. Thus, the machine failure may be inferred to be the probable cause of a system condition, even when that system condition has not yet manifested in the system.

The event patterns may be said to be persistent due to the fact that they are iteratively associated with the occurrence of a particular (present or future) system condition. For example, historical system data, such as system event data from an infrastructure management system, is analyzed for event patterns associated with the occurrence of a particular system condition. Event patterns emerge from this analysis and are tested using real-time system event data. Once repeatable (or persistent) event patterns emerge from this pattern validation and testing phase, the event patterns may be more reliable predictors of the occurrence of future system conditions.

Further, the event patterns may be refined during this testing, learning, and validation phase. For example, precursor events may be detected and/or added to the persistent event patterns to increase the amount of lead time or notice time given for addressing or preventing system conditions. As another example, other events may be added or removed from the event patterns to increase reliability or effectiveness of the event patterns in detected or predicting future system conditions.

A system having event patterns defined through analysis of its own system events may predict errors and fault conditions in that system more accurately than a system having merely generic event patterns assembled by analysis of system events from a generic test component environment, or through the general know-how of experienced IT administrators.

Thus, the teachings of the present disclosure as presented through the particular embodiments described herein disclose a fault correlation method in a managed network or system. The fault correlation method seeks to determine root causes of problems, such as network or system faults, by comparing observed behaviors against known patterns of fault behavior. Fault patterns typically involve sequences of events. For example, in one sequence of events leading up to a particular fault, failure A is generally experienced after event B was observed. Fault patterns additionally often involved relationships among entities in the managed environment. For example, entity X may be connected to an entity Y that experiences a fault condition, or via some other relationship or correlation. Creation of these patterns has traditionally relied upon the expertise of individuals who manage these environments.

This type of expertise takes years to accumulate and even longer to teach. However, this expertise may be encoded in network and systems management software as algorithms that are designed to look for specific events or conditions. The algorithms may additionally be designed to traverse specific relationships in pursuit of fault patterns. As another example, these algorithms may check for certain managed entity state conditions and/or draw conclusions of root causes from other symptomatic entities.

A dynamic, inference-based fault correlation method detects or learns fault correlation and root cause patterns dynamically during operation and subsequently applies that knowledge to perform fault correlation and root cause analysis operations. In one implementation the dynamic, inference-based fault correlation method performs the following steps.

In certain embodiments, event and alarm history is captured for components in a managed network. This history data may identify various aspects of system behaviors, such as identification of problems, errors, or faults experienced within the system. The severity and time of the errors are also tracked. A performance management or unified infrastructure management application may gather such data and store it in a database or otherwise transmit such data to a fault correlation method. The data may also indicate which managed entities were involved in the error or fault condition, and the alarms raised and other actions taken by the management system, if any.

Next, the pattern detection and fault correlation algorithm is applied to detect new patterns in the received set of seemingly random events. For example, event types, event times, event sequencing, event severity, event impact, and relationships between managed entities involved in the events are correlated across events pre-dating instances of various faults or system errors. A string of common events is extrapolated from the set of system events to form a fault event correlation string. Each instance of the event embodies some form of the fault event correlation string in the set of events that led up to the fault or error condition in the system.

In certain embodiments, the pattern detection and fault correlation algorithm may consult existing patterns associated with a particular error in order to detect new event patterns that likely trigger or strongly suggest occurrence of that particular type of event. Thus, an existing set of patterns may be consulted and expanded in the determination and generation of new event patterns.

These event strings are also called patterns of events. New patterns detected by the pattern detection and fault correlation system are added to the management system's knowledge base of patterns. These patterns may then be subsequently utilized during infrastructure management and monitoring operations to identify and/or recognize the occurrence of patterns, both new and old, using the pattern recognition algorithm. Thus, these new patterns may be used to predict and mitigate potential errors and problems before they form error or fault conditions in the constituent components of the system.

In certain embodiments, tunable parameters enable the pattern detection and recognition algorithms to be tuned or refined. For example, priority or importance of variables may be adjusted. Tolerances and thresholds may also be defined. For example, the pattern detection algorithm may default to a set of tolerances and thresholds for identification of event patterns in a system. Those thresholds and tolerances may be modified or tuned in improving or customizing the capacity of the pattern detection algorithm in detecting new instances of fault conditions in a system. For example, an administrator may have experience that informs him of a specific condition that is experienced via system events before a fault condition is triggered. The administrator may adjust the parameters of the patterns as desired and the pattern detection algorithm may use these updated patterns in detecting patterns in real-time event data.

Detected patterns may additionally be validated against known patterns, such as those patterns that are already present in a pattern detection process in an infrastructure management system that may have been defined heuristically, such as by a domain expert. Validation of patterns can be used to refine the tuning parameters which may help improve the accuracy and efficiency of the detection and recognition algorithms.

With reference to FIG. 1, a system 100 for preventing and servicing system errors with event pattern correlation is illustrated in accordance with a non-limiting embodiment of the present disclosure. FIG. 1 includes computer 10 connected to components 60*a-n* through a network 40. Computer 10 is additionally connected to several databases or data stores, such as inference database 50, monitoring database 52, and alarm resolution database 54. Computer 10 includes a memory 20, processor(s) 30, input/output 32, interface 34, and hard disk 36. Processor 30 loads instructions, for example, from hard disk 36 into memory 20 and executes those instructions as processes, services, or the like. For example, processor 30 executes an inference engine 22 and pattern analyzer 24 in memory 20.

Components 60a-n represent the vast number of components that may be spread across a system. For example, components 60a-n may be configuration items. Physical and virtual components may comprise large numbers of configuration items that define the smallest functional computing components, applications, or services. Components may also represent virtual components, such as virtual disk, memory, and processing resources. Further, components may represent physical infrastructure devices, such as entire servers or data centers in a cloud computing environment.

In certain embodiments, pattern analyzer 24 uses inference data from inference database 50 to inspect real-time system monitoring data, such as real-time events. Inference data includes fault patterns, event patterns, fault correlations, error indication patterns, and the like. The inference engine may utilize generic event patterns, such as those that are manually defined by an administrator or distributed with an infrastructure management system. In certain embodiments, the pattern analyzer 24 may additionally use event patterns and fault correlations that have been dynamically defined by inference engine 22 based on review and analysis of historical event data, such as monitoring data 52. In the depicted embodiment, a third party or other system may conduct the management of system events, such as the storing of historical system events in monitoring database 52.

Pattern analyzer 24 receives real-time events from monitored components 60a-n and determines whether known patterns as defined by inference data 50 occur in components 60a-n of the system. This analysis may include receiving real-time events, storing real-time events in memory 20, and analyzing the real-time events to look for the occurrence of event sequences. Each pattern may specify a particular sequence and/or relationship between each of the events. In certain embodiments, the pattern specifies a severity level, threshold, characteristic, or other configuration setting that specifies properties of the system events.

Pattern analyzer 24 additionally accesses alarm resolution data 54 which may include inference handlers for solving, mitigating, or preventing problems detected in components 60a-n. Event patterns may include a reference to an inference handler. The event pattern may suggest or infer that an error has occurred. The inference handler may be a resolution to that error. Additionally or alternatively, the event pattern may suggest or infer a root cause of a particular error or a future predicted error. The inference handler may address the root cause of the error in order to ameliorate the effects of the error or prevent the error from occurring.

Inference engine 22 generates new event patterns by referencing historic system event data from monitoring database 52. Inference engine 22 accesses events that occur before and/or after a particular system error. For example, monitoring database 52 includes system error and alert data in a relational structure along with system events for various historical time periods. The system event data can be organized or sorted by time period based on when a particular event occurred. Events are retrieved from the database for a specific error type. For example, events surrounding the time period that a particular event was triggered are retrieved. This process may be repeated for each instance of that type of event. Thus, a collection of system events from various time periods are collected. The events may be associated with one particular type of alarm, error, or fault condition.

In certain embodiments, the events may not be associated with any alarm, error, or fault condition other than a temporal relationship. For example, the collected events may be a random collection of all events that occurred within a particular period of time of every instance of a particular type of event in the past month. As another example, the events may share a relationship with a particular component that triggered the alarm or error. The teachings of the present disclosure should not be limited by the specific type of culling mechanism for events. A wide variety of queries may be used to retrieve event data for each error instance.

Inference engine 22 may scan the numerous events looking for patterns or sequences of events surrounding each alarm or error instance. The sequences or patterns need not result directly in an alarm or error condition. For example, the event sequence may not be a direct cause of or may be several steps removed from the triggering of the actual fault condition or error scenario that caused the alarm.

In certain embodiments, inference engine 22 may ignore relationships between events and an alarm. For example, inference engine 22 may employ a pattern detection algorithm that correlates common patterns in events that occurred in the time periods leading up to each instance of an alarm or fault condition. The pattern detection algorithm may locate a seemingly random string of events that are common to all error instances. Thus, the pattern detection algorithm may uncover a new sequence of events that foreshadow a system error, even though the relationship between the sequence of events and the manifestation of the fault conditions is not yet understood. In some cases, the fault conditions and the sequence of events may not be related in any recognizable way; however, the sequence of events may be a likely predictor of the manifestation of the fault conditions in at least one existing system component.

Inference engine 22 may hone in on common event patterns by validating the detected event patterns with existing pattern definitions, such as those definitions that exist in inference database 50. Testing and validation of the patterns may occur in simulated event environments. For example, monitoring data 52 contains historical event data that can be used to recreate scenarios to test new patterns and validate the patterns.

Inference handlers may be created to handle, mitigate, or prevent system errors detected or predicted using the new event patterns. Inference handlers may be linked to one or more event patterns and deployed on system components when event pattern criteria is satisfied by real-time events. Inference handlers may address inferred errors by modifying configuration settings, volume, utilization, or load in order to prevent the occurrence of the inferred error condition. Inference handlers may additionally alert administrators that a particular sequence of events has been recorded and that the system has inferred the occurrence of or the potential occurrence of an instance of a particular type of error. The inference handler may be deployed upon detection of the event pattern sequence in real-time events received by inference engine 22.

Figure 2:
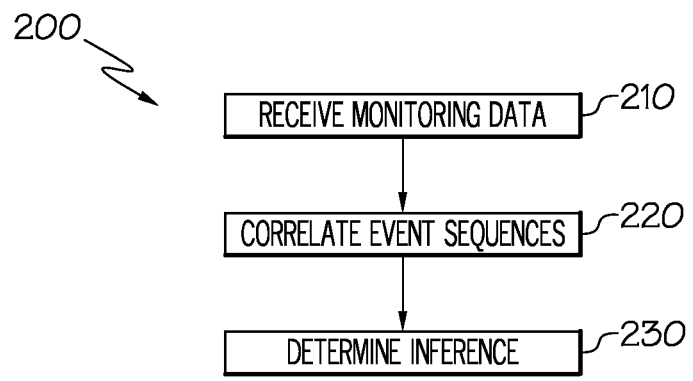
FIG. 2 illustrates a flow chart of a method for preventing and servicing system errors with event pattern correlation in accordance with a non-limiting embodiment of the present disclosure.

With reference to FIG. 2, a method 200 for preventing and servicing system errors with event pattern correlation is illustrated in accordance with a non-limiting embodiment of the present disclosure. At step 210, monitoring data is received. For example, monitoring data regarding historical and/or real time system events is received at a particular agent. The monitoring data is received from a database of monitoring data for a large number of components in a managed network. For example, the monitoring data may be received from an infrastructure management system set up to monitor the health of a particular IT environment.

At step 220, event sequences are correlated using the received events. The correlation may be based on the occurrence of a series of instances of a particular type of event, fault condition, or system error. For example, events occurring within a particular time frame of a certain error are analyzed against other events that occur within a particular time frame of another instance of that error. Event sequences are extrapolated from the event data correlation using a sequence of common events that occur in each grouping of events with respect to each instance of the error. Thus, a common event sequence is determined by analyzing the groups of events. The sequence may be determined by comparing event characteristics and properties. For example, events associated with a particular component show that those components fail just before a particular type of error occurs with another unrelated system component. As another example, events may demonstrate increased utilization of a particular application about five minutes before a separate unrelated or related application fails. These events may be correlated based on historical data for a system, and thus may be customized for the particular applications, services, and component structure of a managed network.

At step 230, inferences may be determined based on the common event sequences uncovered in step 220. An inference about a seemingly unrelated system event, such as an error or a fault condition may be drawn based on the event sequence. For example, the system may infer that the event sequence, or sub-sequence of the event sequence, is the root cause of an error. As another example, the system may infer that a particular related component is the root cause of the manifestation of a set of fault conditions in a system component. The teachings of the present disclosure contemplate a variety of event correlation methods and inference drawing techniques. For example, the inference may be based on the sequence of events in connection with another known sequence of events and inference handler already stored in the infrastructure management system.

Figure 3:
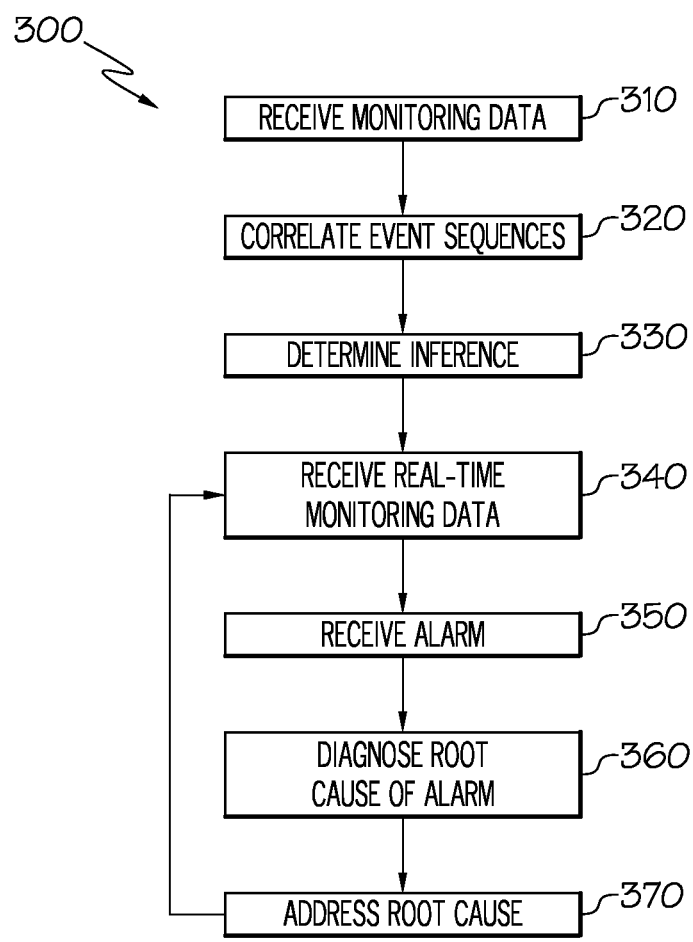
FIG. 3 illustrates a flow chart of a method for preventing and servicing system errors with event pattern correlation in accordance with a non-limiting embodiment of the present disclosure.

With reference to FIG. 3, a method 300 for preventing and servicing system errors with event pattern correlation is illustrated in accordance with a non-limiting embodiment of the present disclosure. At step 310, monitoring data is received. As described above, monitoring data includes common system events that may be related to any system component in a managed network. This includes historical monitoring data such as historical event data for the system components in the managed network.

At step 320, event sequences are correlated from the system monitoring data. As described above correlation of event sequences may uncover a series of common event patterns or strings of events that often lead to or occur before a specific fault condition, error, or alarm in an infrastructure management system.

At step 330, inferences are determined. For example, a root cause of an error is determined. Root causes may be determined based on the event patterns. In certain embodiments, inferences are determined based on a comparison of event patterns with other known event patterns. For example, an inference may be an estimate of escalation of a particular error unless an action is taken. This inference may be drawn with reference to other inferences and event patterns. Thus, by combining and comparing inferences and event patterns, other inferences and larger event patterns may be generated to provide predictions and advice for administrators based on common system events received in an infrastructure management system.

At step 340, real-time monitoring data is received. Real-time monitoring data includes events generated by system components, agents, or monitors for the system components in an infrastructure management system. Those of ordinary skill in the art will realize that a slight propagation delay may occur between actual physical occurrence of the event manifestation and the signaling of the event. However, the event is still said to be received in real-time or near real-time despite this understood natural delay.

At step 350, an alarm is received. An infrastructure management system may issue alarms upon occurrence of a set of fault conditions. In other words, an infrastructure management system may monitor one or more system components and may determine when a set of conditions has manifested itself in the one or more system components. The infrastructure management system may issue an alert when the fault condition is determined. The fault condition may be determined with reference to events including the real-time events. The infrastructure management system may create an alarm and notify particular agents, such as the inference engine 22 of FIG. 1.

At step 360, a root cause of the alarm is diagnosed using the event patterns determined in the preceding steps. For example, the alarm may be part of the event patterns. The alarm may be the last event in the sequence of event patterns required to diagnose a real-time error in the system. In this instance, the root cause of the error may be diagnosed based on the inference for the event pattern. For example, the system may infer a root cause of an error based on the occurrence of a sequence of events.

At step 370, the root cause, as inferred in step 360, is addressed. For example, a configuration setting of a component is modified to ameliorate the error condition. As another example, workloads are offloaded to a different server to reduce the workload received at a particular component and prevent bottleneck conditions from occurring. Thus, in response to an inference, the system may proactively take actions to prevent, mitigate, or reduce the seriousness of errors. The system may continue on receiving real-time monitoring data at step 340 and continue to detect error patterns.

Figure 4:
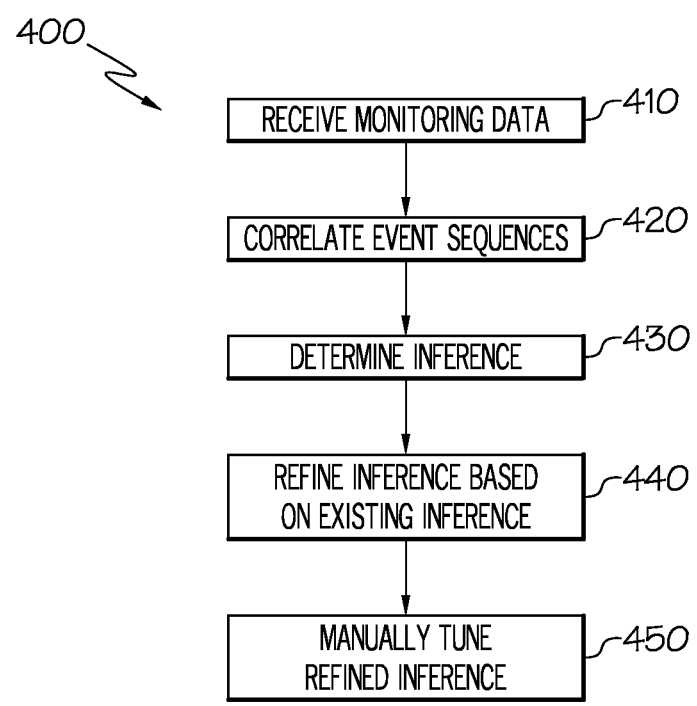
FIG. 4 illustrates a flow chart of a method for preventing and servicing system errors with event pattern correlation in accordance with a non-limiting embodiment of the present disclosure.

With reference to FIG. 4, a method 400 for preventing and servicing system errors with event pattern correlation is illustrated in accordance with a non-limiting embodiment of the present disclosure. At steps 410-430, the method proceeds as described in FIGS. 2-3. At step 440, the inference determined in step 430 is refined. For example, the inference determined in step 430 is refined using additional inferences from an inference database. The additional inference may be previously created inferences or may be programmed by an administrator. The additional inferences may help validate a particular inference. The additional inferences may also help extend that inference. For example, the additional inferences may show that a particular pattern of events exacerbates a particular error. Thus, the system may infer that the particular pattern of events should be avoided and addressed sooner rather than later, after exacerbation of the error.

At step 450, the inference is manually refined. For example, a system for dynamically generating inference handlers may be advanced by manual review and adjustment of dynamically or automatically generated inference handlers. An IT administrator may have great experience troubleshooting aspects of a particular IT environment. Review of these automatically generated inferences and inference handlers may (1) help the administrator to learn more about the inner workings of the managed environment, and (2) help automatic administration and detection of the errors in the system by allowing the administrator to configure thresholds and tune setting of the event patterns and inference handlers.

Figure 5:
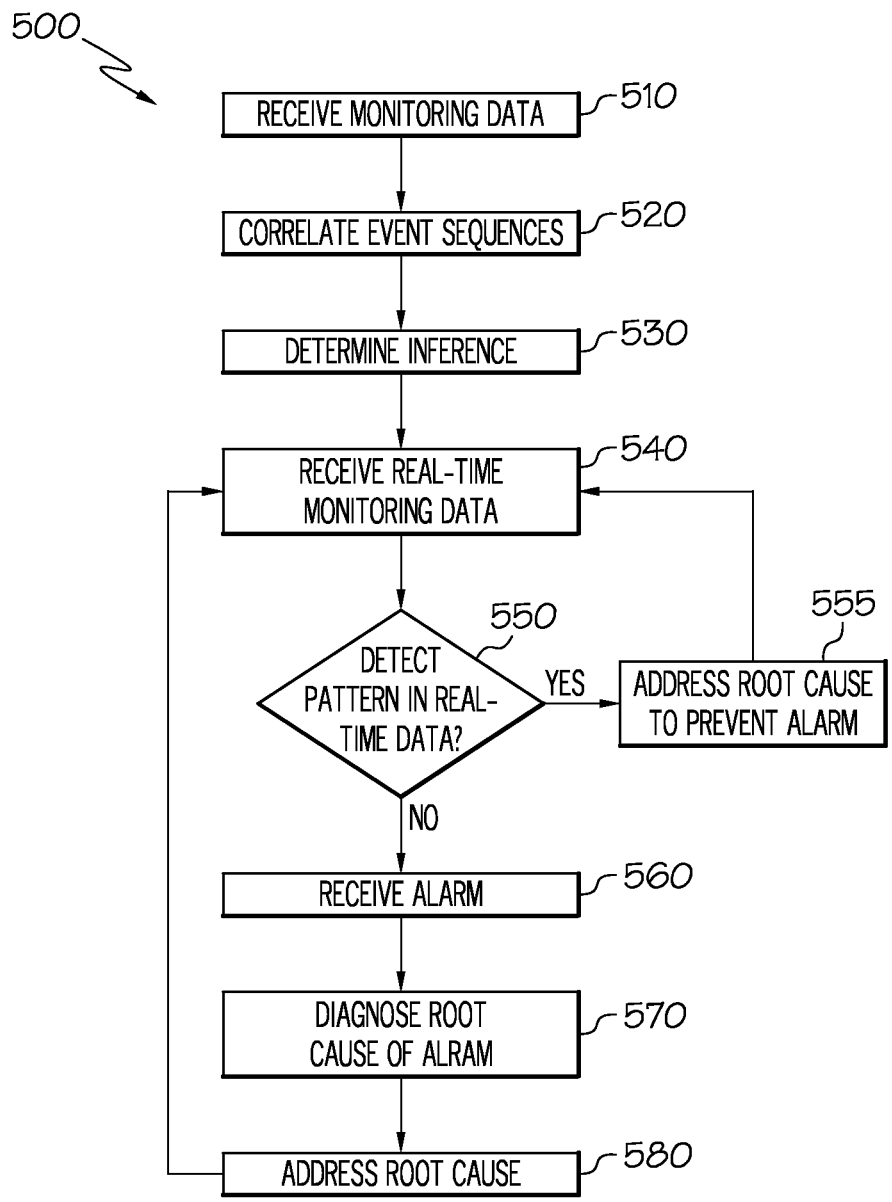
FIG. 5 illustrates a flow chart of a method for preventing and servicing system errors with event pattern correlation in accordance with a non-limiting embodiment of the present disclosure.

With reference to FIG. 5, a method 500 for preventing and servicing system errors with event pattern correlation is illustrated in accordance with a non-limiting embodiment of the present disclosure. Steps 510 through 530 proceed as described in FIGS. 2-3. At step 540, real-time monitoring data is received in the form of system event data from an infrastructure management system.

At step 550, if patterns are detected in the real-time data (i.e., the real-time system events), then a root cause is addressed in order to prevent an alarm. For example, if a root cause of a potential error is addressed before the manifestation of the error conditions that trigger the alarm for the event, the alarm and error may be prevented. Thus, the teachings of the present disclosure may dynamically determine event patterns for addressing and mitigating future or current errors.

At step 560, if patterns are not detected in the real-time data, the system may still use dynamically generated inference handlers and event patterns to address errors. At step 560, an alarm is received. The alarm is indicative of a system error. For example, the alarm is indicative of the manifestation or satisfaction of some error conditions in a particular constituent component of a large scale infrastructure. At step 570, the root cause of the alarm, error, or error condition is diagnosed using the dynamically generated inference handlers and event patterns. At step 580, the root cause of the alarm, error, or error condition is addressed according to the plan specified in the inference handler.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   receiving historical monitoring data for components of a system, the historical monitoring data comprising a plurality of events, each triggered by an associated component, and a plurality of alarms, each triggered by detection of a particular type of condition in the components;
   determining common event sequences in the plurality of events, each event sequence culminating in one of the plurality of alarms;
   correlating the common event sequences into an event pattern;
   for each event sequence, determining a relationship between a common system component and each component that generated each event in the event sequence;
   receiving a plurality of real-time events triggered by the components;
   detecting the event pattern in the plurality of real-time events to predict a potential future instance of the particular type of condition in the components of the system; and
   determining a root cause component based on each determined relationship as applied to the detected event pattern.

2. The method of claim 1, further comprising:
   determining a root cause inference regarding the particular type of condition based on the associated components for each event in the common event sequences; and
   in response to detecting the event pattern in the real-time events, mitigating a root cause of the particular type of condition based on the root cause inference to prevent the potential future instance of the particular type of condition.

3. The method of claim 1, further comprising:
   determining a root cause inference regarding the particular type of condition based on the associated components for each event in the common event sequences;
   receiving a real time alarm triggered by detection of a first error in the components; and
   mitigating a root cause of the first error based on the root cause inference.

4. The method of claim 2, wherein the root cause comprises a configuration setting for a first component, and wherein addressing the root cause comprises modifying the configuration setting.

5. The method of claim 1, wherein the historical monitoring data further comprises information regarding relationships between the components of the system, and wherein the common event sequences are determined based on the relationships between the components.

6. The method of claim 1, wherein the historical monitoring data further comprises attributes for each event in the plurality of events, the attributes comprising an event type, a trigger time, a severity level, an impact level, and an associated component, and wherein the common event sequences are determined based on matching event attributes between each common event sequence.

7. The method of claim 1, wherein the plurality of events in the historical monitoring data are discovered using a component monitoring system.

8. The method of claim 1, further comprising:
accessing a database of predetermined event patterns with associated root cause inferences regarding the particular type of condition; and
modifying the event pattern based on the predetermined event patterns.

9. A computer configured to access a storage device, the computer comprising:
a processor; and
a non-transitory, computer-readable storage medium storing computer-readable instructions that when executed by the processor cause the computer to perform:
receiving historical monitoring data for components of a system, the historical monitoring data comprising a plurality of events, each triggered by an associated component, and a plurality of alarms, each triggered by detection of a particular type of condition in the components;
determining common event sequences in the plurality of events, each event sequence culminating in one of the plurality of alarms;
correlating the common event sequences into an event pattern;
for each event sequence, determining a relationship between a common system component and each component that generated each event in the event sequence;
receiving a plurality of real-time events triggered by the components;
detecting the event pattern in the plurality of real-time events to predict a potential future instance of the particular type of condition in the components of the system; and
determining a root cause component based on each determined relationship as applied to the detected event pattern.

10. The computer of claim 9, wherein the computer-readable instructions further cause the computer to perform:
determining a root cause inference regarding the particular type of condition based on the associated components for each event in the common event sequences; and
in response to detecting the event pattern in the real-time events, mitigating a root cause of the particular type of condition based on the root cause inference to prevent the potential future instance of the particular type of condition.

11. The computer of claim 9, wherein the computer-readable instructions further cause the computer to perform:
determining a root cause inference regarding the particular type of condition based on the associated components for each event in the common event sequences;
receiving a real time alarm triggered by detection of a first error in the components; and
mitigating a root cause of the first error based on the root cause inference.

12. The computer of claim 10, wherein the root cause comprises a configuration setting for a first component, and wherein addressing the root cause comprises modifying the configuration setting.

13. The computer of claim 9, wherein the historical monitoring data further comprises information regarding relationships between the components of the system, and wherein the common event sequences are determined based on the relationships between the components.

14. The computer of claim 9, wherein the historical monitoring data further comprises attributes for each event in the plurality of events, the attributes comprising an event type, a trigger time, a severity level, an impact level, and an associated component, and wherein the common event sequences are determined based on matching event attributes between each common event sequence.

15. The computer of claim 9, wherein the plurality of events in the historical monitoring data are discovered using a component monitoring system.

16. The computer of claim 9, wherein the computer-readable instructions further cause the computer to perform:
accessing a database of predetermined event patterns with associated root cause inferences regarding the particular type of condition; and
modifying the event pattern based on the predetermined event patterns.

17. A computer program product comprising:
a non-transitory computer-readable storage medium having computer-readable program code embodied therewith, the computer-readable program code comprising:
computer-readable program code configured to receive historical monitoring data for components of a system, the historical monitoring data comprising a plurality of events, each triggered by an associated component, and a plurality of alarms, each triggered by detection of a particular type of condition in the components;
computer-readable program code configured to determine common event sequences in the plurality of events, each event sequence culminating in one of the plurality of alarms;
computer-readable program code configured to correlate the common event sequences into an event pattern;
computer-readable program code configured to determine a relationship between a common system component and each component that generated each event in the event sequence;
computer-readable program code configured to receive a plurality of real-time events triggered by the components;
computer-readable program code configured to detect the event pattern in the plurality of real-time events to predict a potential future instance of the particular type of condition in the components of the system; and
computer-readable program code configured to determine a root cause component based on each determined relationship as applied to the detected event pattern.

18. The computer program product of claim 17, wherein the computer-readable program code further comprises:
computer-readable program code configured to determine a root cause inference regarding the particular type of condition based on the associated components for each event in the common event sequences; and
computer-readable program code configured to, in response to detecting the event pattern in the real-time events, mitigate a root cause of the particular type of condition based on the root cause inference to prevent the potential future instance of the particular type of condition.

19. The computer program product of claim 17, wherein the computer-readable program code further comprises:
   computer-readable program code configured to determine a root cause inference regarding the particular type of condition based on the associated components for each event in the common event sequences;
   computer-readable program code configured to receive a real time alarm triggered by detection of a first error in the components; and
   computer-readable program code configured to mitigate a root cause of the first error based on the root cause inference.

20. The computer program product of claim 18, wherein the root cause comprises a configuration setting for a first component, and wherein addressing the root cause comprises modifying the configuration setting.

* * * * *